(No Model.)
G. HOLGATE.
APPARATUS FOR PRESERVING BY GASES.
No. 313,736. Patented Mar. 10, 1885.
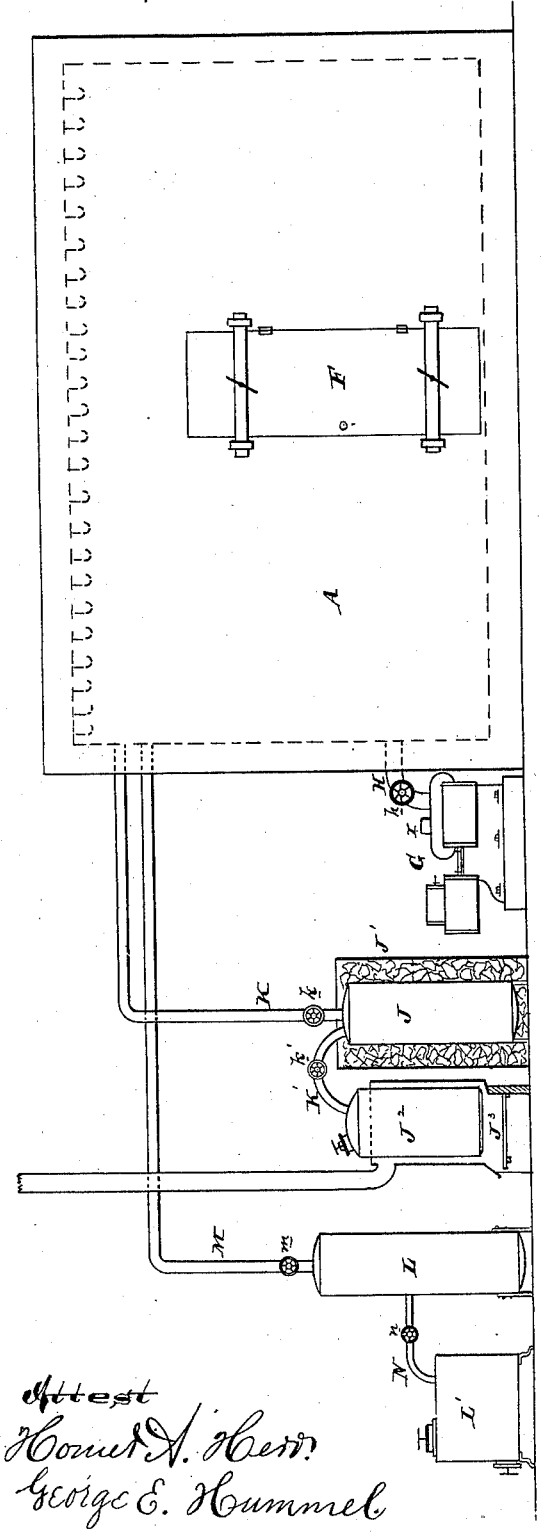
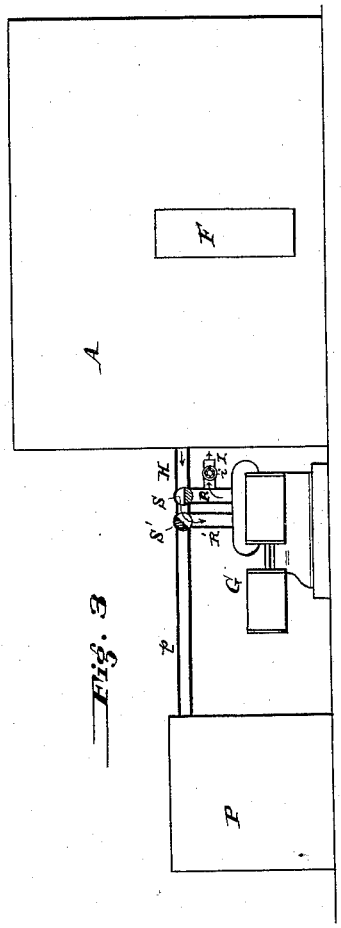
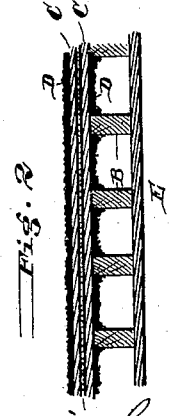

UNITED STATES PATENT OFFICE.

GEORGE HOLGATE, OF PHILADELPHIA, PENNSYLVANIA.

APPARATUS FOR PRESERVING BY GASES.

SPECIFICATION forming part of Letters Patent No. 313,736, dated March 10, 1885.

Application filed June 14, 1884. (No model.) Patented in Canada January 26, 1885, No. 20,967.

*To all whom it may concern:*

Be it known that I, GEORGE HOLGATE, of the city and county of Philadelphia, and State of Pennsylvania, have invented new and useful Improvements in Apparatus for Preserving Substances, of which the following is a specification.

The object of my invention is an apparatus for treating meats and other substances to preserve them by causing the thorough permeation of these substances with preservative gases and prevent them from spoiling or putrefying, no matter what may be the conditions under which they must be kept.

A large chamber is made air-tight and adapted to withstand from inside or outside a considerable pressure without leaking, and is preferably lined or coated internally with metal sheathing, rubber, pitch, or any substance not acted on by sulphurous or other preservative acid. Into this chamber the meat, vegetables, fruits, or any other destructible substance to be preserved is placed, and when the chamber is sealed up tightly a partial vacuum is created therein by withdrawing as far as practicable all of the air from said chamber and its contents, thereby removing the oxygen, the element which is the chief cause of the destruction of animal and vegetable matter. When this has been accomplished, the contents of the chamber are in their best and most favorable condition for preservation, and now sulphurous-acid gas and carbonic-acid gas are forced in by separate pipes, or as a mixture, under more or less pressure, two atmospheres being deemed sufficient, and the contents of the chamber are subjected to the action of said gases, preferably under said pressure, for a period about two hours, when they may be removed and stored or packed for shipment. After extracting the oxygen from the substances to be preserved they are then in the most favorable conditions for the reception of the preserving-gases, and the great pressure under which said gases are placed causes them to penetrate to the innermost parts of said substances, and, having no opposing oxygen to overcome and displace, they perform their function in the most speedy and perfect manner. The process could be equally well carried on without increasing the pressure of the preserving-gases above that of the atmosphere, as then they would have a penetrating power at the beginning of fifteen pounds, which is fully sufficient for most substances, particularly when in small bulk; but in cases where whole sides of beef, &c., or extremely compact fruit and vegetables, are to be preserved, an increase of pressure to, say, fifteen pounds above atmospheric pressure is advantageous, and also increases the rapidity with which the preservation may be effected.

In this application it is to be understood that no attempt is made to subject the substances to be preserved to a liquid bath; but, instead, the fumigation is effected in a vacuum.

It is immaterial to my invention how the carbonic and sulphurous acid gases are produced or forced into the chamber, or whether the apparatus be portable or stationary; but that the method of putting the herein-described process into practice may be more fully understood, I will now describe suitable apparatus adapted for the purpose.

In the drawings, Figure 1 is an elevation of the apparatus in which to carry out my improved process. Fig. 2 is a cross-section of the walls of the preserving-chamber, and Fig. 3 is a modified form of apparatus.

A is the preserving-chamber, and may be made in any manner desired, one form of construction being shown in which the framing B is sheathed on the inside with wood C, and upon the inside of this is secured paper D', next another layer of wood, C', and then the interior is coated with rubber or pitch D, and the outer sheathing or boards, C, are also coated with rubber or pitch D between the framing B, which is then covered by boards E, forming an air-tight chamber in which an air-tight door, F, is suitably placed for admittance and egress.

G is an exhaust or vacuum pump, and connects with the interior of said chamber A by a pipe, H, provided with a valve, h.

J is a vessel in which the sulphurous acid is stored and kept in the liquid condition by the freezing-mixture placed in vessels J' and surrounding the vessel J, which freezing-mixture may be salt and ice. This vessel J connects with the chamber A by a pipe, K, having a valve, $k$. The sulphurous-acid gas may be generated in tank $J^2$, in which carbon and sulphuric acid is placed and heated by a furnace, $J^3$, the gas evolved passing by pipe $K'$ into the vessel J, where it is liquefied by reducing its temperature to 30° below zero. After the vessel J is charged the valve $k'$ in the pipe $K'$ is closed and the freezing-mixture is removed, whereupon the liquid sulphurous acid vaporizes, and at 60° Fahrenheit has a pressure of two atmospheres. This gas is then allowed to pass into the chamber A by the valve $k$, as desired.

L is a vessel in which carbonic-acid gas is stored, and connects with the chamber A by a pipe, M, having a valve, $m$. $L'$ is a vessel in which the carbonic acid may be generated by the action of sulphuric or hydrochloric acid on marble-dust, and the gas so produced is conducted by pipe N, provided with a valve, $n$, into the vessel L, where it is stored under a pressure of about two atmospheres.

There are many ways of producing sulphurous and carbonic acid gases, and I therefore do not limit myself to the processes herein set forth for their production, the same being immaterial to my invention, which contemplates their uses after being produced.

The operation is as follows: The meat, vegetables, or fruit to be preserved is placed in the chamber A, preferably inclosed in a bag, and when the said chamber is sealed up tightly the valves $k$ and $m$ are closed and $h$ opened and vacuum-pump G put in motion. A partial vacuum will soon be produced within the chamber A, (and the greater the said vacuum the better,) and thus all the air practically removed from the substances to be preserved, and which are then in the most perfect condition for the reception of the preserving-gases. The valve $h$ is now closed and valves $k$ and $m$ opened, admitting both the sulphurous and carbonic acid gases under pressure, say, of fifteen pounds above atmospheric pressure, or thirty pounds above a vacuum; hence at the time of their admission they act upon the deoxygenated substances with a pressure of thirty pounds, thus causing the gases to permeate every part of said substance in the most perfect manner. After subjecting these substances to the action of these preserving-gases under pressure for a period of about two hours the valves $k$ and $m$ are closed and valve $h$ opened, and the gases are gradually drawn off, and when reduced to normal pressure the door F is opened and the chamber ventilated sufficiently for the operators to enter and remove the contents.

The inclosing-bags will also be impregnated with the preserving-gases, and thus not only will the article to be preserved be kept clean in handling, but will be further protected from spoiling by the impregnated sack or wrapper.

If desired, the gases drawn off may be stored for further use in the next operation, or may be pumped into another chamber (not shown) to reduce the production of these gases. The substances so prepared will last an indefinite time if subjected to normal conditions of temperature and atmosphere, and, being preserved in a dry atmosphere, there is no possibility for displacement of the preserving-gases, which practically form a film over each infinitesimal part of the thing preserved.

If desired, the sulphurous and carbonic acid gases may be produced in one chamber, P, Fig. 3, by burning sulphur and carbon, and then forced into the chamber A under pressure by the pump G. To do this the chamber A is connected with the chamber P by pipes $p$ H, in which are valves S S'. Opening into said pipes at the said valves are the induction and eduction pipes R' R of the pump G. Opening from the eduction-pipe R is a pipe, I, having a valve, $i$.

To exhaust the air from chamber A, the valves S S' are turned, as shown, and valve $i$ opened. The air is then withdrawn, as indicated by the arrows. When the proper extent of vacuum is produced, the valve is closed and valves S S' turned, so as to cause the gases from chamber P to pass through pipes $p$ R', through the pump G, by which they are forced through pipes R and H into the chamber A under any desired pressure. Hence it is clearly evident that the gases may be forced into the chamber by their own self-generation power (due to their expansibility) or by the aid of mechanical means, and may be mixed before or after entering the said chamber A.

I do not here claim the process of preserving meats by the described application of preservative gases, as the same constitutes the subject of a separate application for Letters Patent filed November 26, 1884.

I do not claim, broadly, an apparatus for exhausting the air from a chamber containing meats and for supplying preservative gases thereto, as this has been done in the preservation of meats by sealing them with preservative gases in air-tight cases. My application is intended for the treatment and not the preservation of meats, &c., and differs from that described in having a fixed receptacle with an opening closed by a cap or door, through which the articles to be treated may be passed into and out of the receptacle.

Having now described my invention, what I claim as new, and desire to secure by Letters Patent, is—

1. In an apparatus for treating animal and vegetable substances in the preservation thereof, the combination, with an air-tight treating-chamber having an opening for the insertion and removal of the articles to be preserved, of a vacuum-pump, a generator, condensing-cylinder and cooler for sulphurous acid, and connecting-pipes, substantially as described.

2. In an apparatus for treating animal and vegetable substances in the preservation thereof, the combination of a vacuum-pump, a generator for sulphurous acid, a condensing-chamber with cooler or refrigerator for same, a generator for carbonic acid, and pipes and connections therefor, substantially as described.

In testimony of which invention I hereunto set my hand.

GEORGE HOLGATE.

Witnesses:
   R. M. HUNTER,
   WILLIAM C. MAYNE.